US009616868B2

(12) United States Patent
Speer et al.

(10) Patent No.: US 9,616,868 B2
(45) Date of Patent: Apr. 11, 2017

(54) PRE-ASSEMBLAGE INTERNAL GEAR PUMP

(71) Applicant: Robert Bosch GmbH, Stuttgart (DE)

(72) Inventors: Harald Speer, Freiberg (DE); Rene Schepp, Waiblingen (DE); Edgar Kurz, Heilbronn-Horkheim (DE); Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/436,529

(22) PCT Filed: Aug. 21, 2013

(86) PCT No.: PCT/EP2013/067349
§ 371 (c)(1),
(2) Date: Apr. 17, 2015

(87) PCT Pub. No.: WO2014/060136
PCT Pub. Date: Apr. 24, 2014

(65) Prior Publication Data
US 2016/0046271 A1    Feb. 18, 2016

(30) Foreign Application Priority Data
Oct. 19, 2012  (DE) .................. 10 2012 219 118

(51) Int. Cl.
| F01C 11/00 | (2006.01) |
| F03C 2/00 | (2006.01) |
| F03C 4/00 | (2006.01) |
| F04C 2/00 | (2006.01) |
| B60T 13/14 | (2006.01) |
| B60T 8/36 | (2006.01) |
| B60T 17/02 | (2006.01) |
| F04C 2/08 | (2006.01) |
| F04C 2/10 | (2006.01) |
| F04C 11/00 | (2006.01) |
| F04C 15/00 | (2006.01) |

(52) U.S. Cl.
CPC ............ B60T 13/148 (2013.01); B60T 8/368 (2013.01); B60T 17/02 (2013.01); F04C 2/086 (2013.01); F04C 2/102 (2013.01); F04C 11/00 (2013.01); F04C 11/001 (2013.01); F04C 15/0026 (2013.01)

(58) Field of Classification Search
CPC .......... F04C 2/084; F04C 2/086; F04C 2/102; F04C 2/18; F04C 11/00; F04C 11/001; F04C 15/0026; B60T 13/148; B60T 8/368; B60T 17/02
USPC .................. 418/199, 170, 171, 132–133, 102
See application file for complete search history.

(56) References Cited

FOREIGN PATENT DOCUMENTS

| DE | 196 13 833 A1 | 10/1997 |
| DE | 10 2007 030 249 A1 | 1/2009 |

(Continued)

OTHER PUBLICATIONS

International Search Report corresponding to PCT Application No. PCT/EP2013/067349, mailed Oct. 4, 2013 (German and English language document) (5 pages).

*Primary Examiner* — Theresa Trieu
(74) *Attorney, Agent, or Firm* — Maginot, Moore & Beck LLP

(57) ABSTRACT

An internal gear pump, in particular a hydraulic pump for a slip-controlled vehicle braking system, is configured to be pre-assembled. The internal gear pump includes a cartridge configured as a casing, which is configured to be inserted in a receptacle in a hydraulic block of a vehicle braking system.

2 Claims, 4 Drawing Sheets

(56) References Cited

FOREIGN PATENT DOCUMENTS

| | | |
|---|---|---|
| DE | 10 2009 047 626 A1 | 6/2011 |
| JP | 1-147178 A | 6/1989 |
| JP | 2005-529279 A | 9/2005 |
| WO | 01/56850 A1 | 8/2001 |
| WO | 03/106237 A1 | 12/2003 |

US 9,616,868 B2

PRE-ASSEMBLAGE INTERNAL GEAR PUMP

This application is a 35 U.S.C. §371 National Stage Application of PCT/EP2013/067349, filed on Aug. 21, 2013, which claims the benefit of priority to Serial No. DE 10 2012 219 118.6, filed on Oct. 19, 2012 in Germany, the disclosures of which are incorporated herein by reference in their entirety.

The disclosure relates to an internal gear pump for a hydraulic vehicle brake system. Such internal gear pumps are employed, instead of conventionally used piston pumps, in traction-controlled and/or power-assisted vehicle brake system and are often designated, albeit not necessarily correctly, as recirculating pumps.

BACKGROUND

Internal gear pumps are known. They have a ring wheel and a pinion which is arranged eccentrically in the ring wheel and which meshes on a circumferential portion with the ring wheel. The ring wheels are internally toothed gearwheels and the pinions externally toothed gearwheels, and the ring wheel and pinion may also be interpreted as gearwheel of the internal gear pumps. Designation as pinion and as ring wheel serves for distinguishing them. Opposite the circumferential portion on which the gearwheels mesh, there is between the ring wheel and the pinion a sickle-shaped free space which is designated here as a pump space. Arranged in the pump space is a separation piece, against which tooth tips of the two gearwheels come to bear on the outside and inside and which divides the pump space into a suction space and a delivery space. The separation piece, because of its typical shape, is often also designated as a sickle or sickle piece. Another designation of the separation piece is a filling piece. By rotary drive, the gearwheels covey fluid from the suction space into the delivery space. Internal gear pumps without a separation piece, which, to distinguish them, may be designated as annular gear pumps, are also known.

The patent DE 196 13 833 B4 discloses such an internal gear pump with a dedicated housing, by means of which it can be flanged, for example, to an electric motor which serves for driving it. This internal gear pump is not intended for hydraulic vehicle brake systems.

The laid-open publication DE 10 2009 047 626 A1 discloses an internal gear pump for a hydraulic vehicle brake system, which does not have a dedicated housing, but instead is installed in a hydraulic block of a traction control of a hydraulic vehicle brake system. The hydraulic block may be interpreted as a housing of the internal gear pump.

Such hydraulic blocks are known, and they serve for the mechanical fastening and hydraulic connection of hydraulic structural elements of a traction control. Such structural elements are, in addition to internal gear pumps, solenoid valves and hydraulic accumulators for the traction control. The hydraulic block is conventionally a parallelepipedal part made from metal, in particular from aluminum, in which cylindrical countersinks, often of stepped diameter, as receptacles for the hydraulic structural elements of the traction control and bores, which connect hydraulically the receptacles or the structural elements installed in them, are formed.

SUMMARY

The internal gear pump according to the disclosure is designed as a premountable subassembly and has as housing a cartridge which can be inserted into a receptacle for the internal gear pump, in particular, in a hydraulic block of a traction control of a hydraulic vehicle brake system. The internal gear pump according to the disclosure, by being designed as a subassembly, can be handled in the same way as a standard component, thus simplifying its assemblage and, in particular, insertion into the receptacle. A further advantage of the disclosure is the possibility of testing the functioning capacity and (pressure) tightness of the internal gear pump after its premounting as a subassembly and even before insertion into the receptacle. Series manufacture usually employs pressing-in and caulking processes which do not allow removal and reinstallation. In the event of a fault, the internal gear pump is a reject. If an internal gear pump is already installed in a hydraulic block, in the event of a fault not only the internal gear pump, but also the hydraulic block, together with the installed hydraulic structural elements, are rejected as a whole.

A cartridge is to be understood to mean the housing of the internal gear pump, said housing being designed on the outside to match with the receptacle such that it can be inserted with an exact fit in the receptacle.

Advantageous refinements and developments of the disclosure specified in the claims and the drawings.

A preferred refinement of the disclosure includes a double internal gear pump with two internal gear pumps according to the disclosure, each of which is intended for a brake circuit of a hydraulic dual-circuit vehicle brake system. The two internal gear pumps are arranged separately from one another in two receptacles of a surround housing and have a common drive, for example by means of a gearwheel. The housing of the two receptacles for the two internal gear pumps is designated as a surround housing to distinguish it from the housings of the internal gear pumps designed as premountable subassemblies. In particular, a hydraulic block forms the housing or surround housing for the two internal gear pumps.

The internal gear pump according to the disclosure is intended, in particular, as a hydraulic pump for a hydraulic, traction-controlled and/or power-assisted vehicle brake system, instead of a conventionally used piston pump. In traction-controlled vehicle brake systems, hydraulic pumps are also designated as recirculating pumps. As stated, the preferred embodiment as a double internal gear pump according to the disclosure is intended for a dual-circuit vehicle brake system with a gear pump for each brake circuit.

DESCRIPTION OF THE DRAWING

The disclosure is explained in more detail below by means of an embodiment illustrated in the drawing in which.

DETAILED DESCRIPTION

Figure 1:
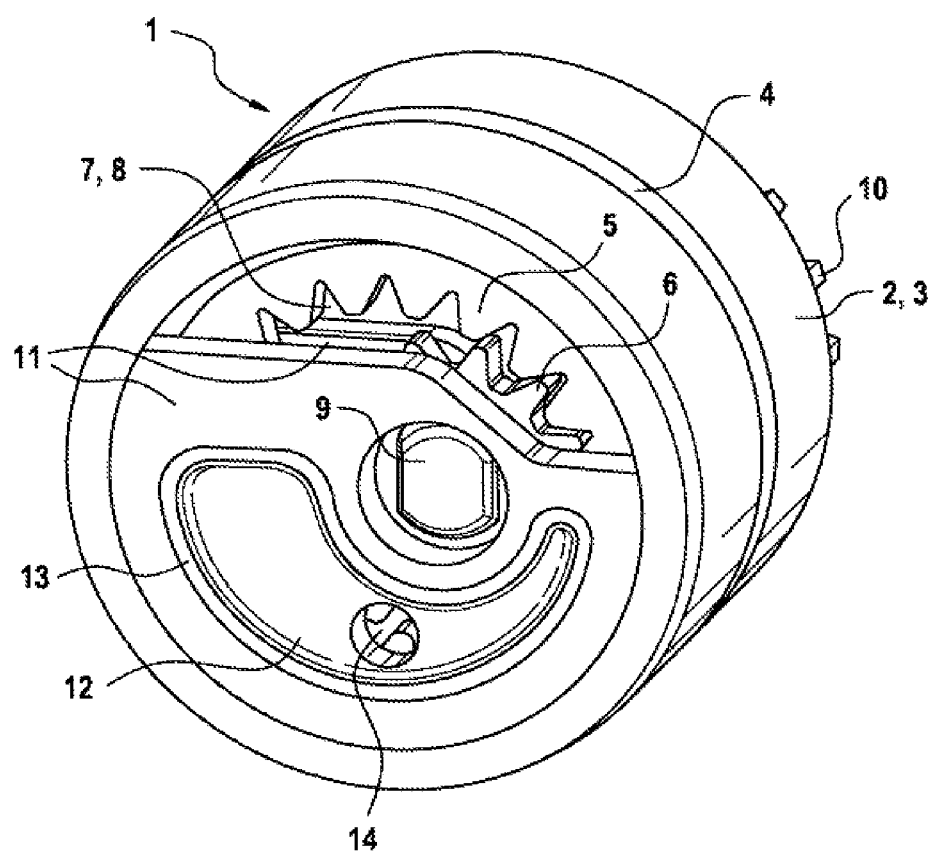
FIG. 1 shows an internal gear pump according to the disclosure in a perspective illustration.
Figure 2:
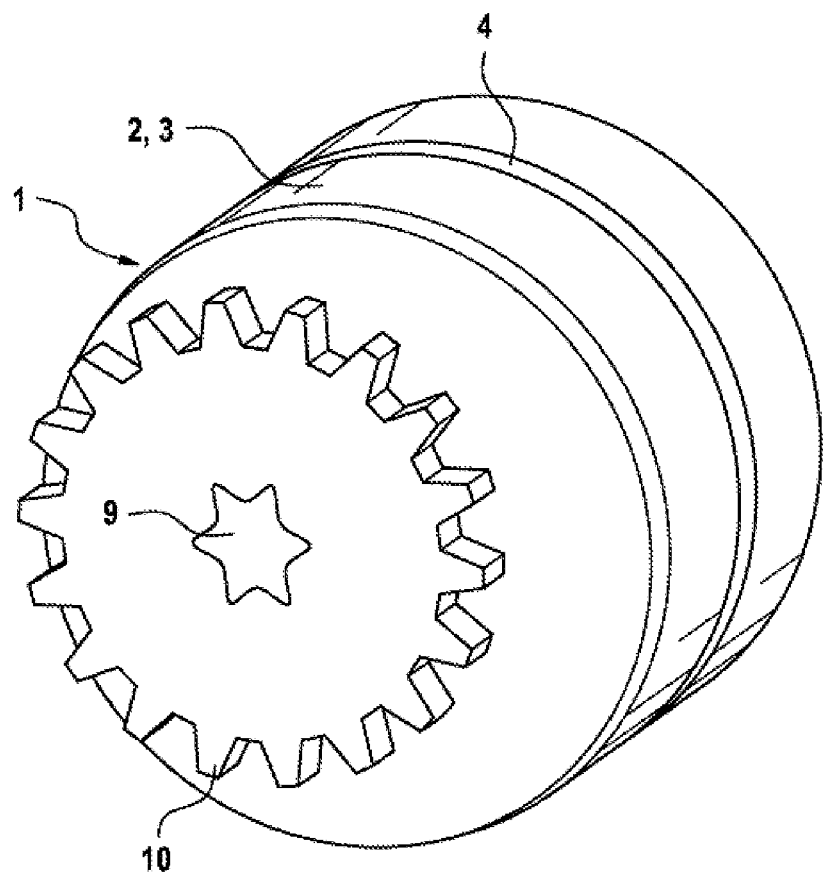
FIG. 2 shows the internal gear pump from FIG. 1 with an opposite viewing direction.

FIGS. 1 and 2 show an internal gear pump 1 according to the disclosure for a hydraulic vehicle brake system. The internal gear pump has a cylindrical housing 2 which is open on one side and which is designed as a cartridge for insertion into a receptacle yet to be explained. The cartridge 3 has in a longitudinal center a peripheral groove, into which a sealing ring 4, in the exemplary embodiment an O-ring, is introduced.

At an open end, visible in FIG. 1, of the cartridge 3 can be seen a ring wheel 5, arranged coaxially in the cartridge 3 and mounted rotatably therein, and a pinion 6 of the internal gear pump 1, which pinion is arranged eccentrically in the ring wheel 5 and meshes with the ring wheel 5. The pinion 6 is an externally toothed gearwheel and the ring wheel 5 an internally toothed gearwheel, which, to distinguish them, are designated as pinion 6 and as ring wheel 5. Outside a circumferential portion in which the pinion 6 meshes with the ring wheel 5, in the open end of the cartridge 3 can be seen one end of a sickle-shaped free space, designated here as a pump space 7, between the pinion 6 and the ring wheel 5. The visible end of the pump space 7 is a suction space 8 in which the internal gear pump 1 sucks in brake fluid. A separation piece which is arranged in the pump space 7 and divides the pump space 7 into the suction space 8 and a delivery space, not visible, at the other end of the pump space 7 cannot be seen in the drawing. By rotary drive, the pinion 6 and the ring wheel 5 convey brake fluid from the suction space 8 to the delivery space in a way known per se.

The pinion 6 is fixed rotationally on a pump shaft 9 which, sealed off, is led through the closed end of the cartridge 3 forming the housing 2 of the internal gear pump 1. As can be seen in FIG. 2, the internal gear pump 1 has a gearwheel as a drive wheel 10 which is arranged outside on the closed side of the cartridge 3 and which is mounted fixedly in terms of rotation on the pump shaft 9 there.

Axial disks 11, which bear against the pinion 6, the ring wheel 5 and the separation piece, are arranged on both sides of the pinion 6, of the ring wheel 5 and of the separation piece, not visible in the drawing, which is arranged in the pump space 7. The axial disks 11 are axially movable and fixed rotationally, they cover the delivery space, not visible, and the separation piece, not visible, and are cut out in the region of the suction space 8. Such axial disks are also designated as pressure or control disks or plates. In the outsides facing away from the pinion 6, the ring wheel 5 and the separation piece, the axial disks 11 have what are known as pressure fields 12 which are surrounded by a pressure field seal 13. The pressure fields 12 are flat depressions, kidney-shaped in the embodiment depicted, which extend approximately over the delivery space and the separation piece. Action upon the pressure fields 12 by pressure brings the axial disks 11 into sealing bearing contact against the pinion 6, the ring wheel 5 and the separation piece. The pressure fields 12 have a through hole 14, through which they communicate with the delivery space of the internal gear pump 1. The axial disk 11 which faces an observer in FIG. 1 is exposed, that is to say its outside facing away from the pinion 6, the ring wheel 5 and the separation piece is not covered, and in the embodiment it is approximately flush in one plane with the open end of the cartridge 3 which forms the housing 2 of the internal gear pump 1.

The internal gear pump 1 is premounted as a subassembly in the cartridge 3 which forms the housing 2 of the internal gear pump 1. By being premounted as a subassembly, the internal gear pump 1 can be handled and installed in the same way as a standard component, and moreover it is possible to carry out a functioning capacity and leaktightness test of the internal gear pump 1, premounted as a subassembly, before it is installed.

Figure 3:
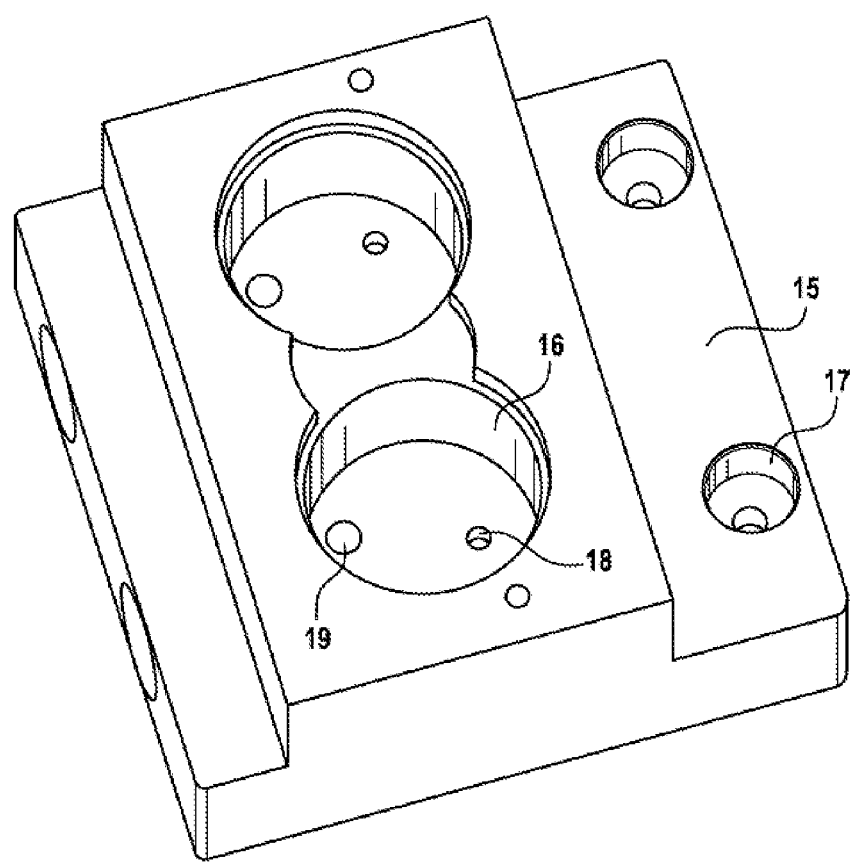
FIG. 3 shows a hydraulic block with two receptacles for two internal gear pumps from FIGS. 1 and 2 in perspective illustration.

FIG. 3 shows a hydraulic block 15 of a traction control, not otherwise illustrated, of a hydraulic vehicle brake system. The hydraulic block 15 is a block-shaped part made from aluminum, in which countersinks as receptacles 16 for hydraulic structural elements of the traction control are formed. The hydraulic block 15 has, inter alia, receptacles 16 for two internal gear pumps 1 illustrated in FIGS. 1 and 2 and for solenoid valves and hydraulic accumulators, not illustrated. What can be seen in FIG. 1 are also two countersinks as connections 17 of a dual-circuit master brake cylinder, not illustrated. The other receptacles are located on the side, lower in the drawing, of the hydraulic block 15 and therefore cannot be seen.

Figure 4:
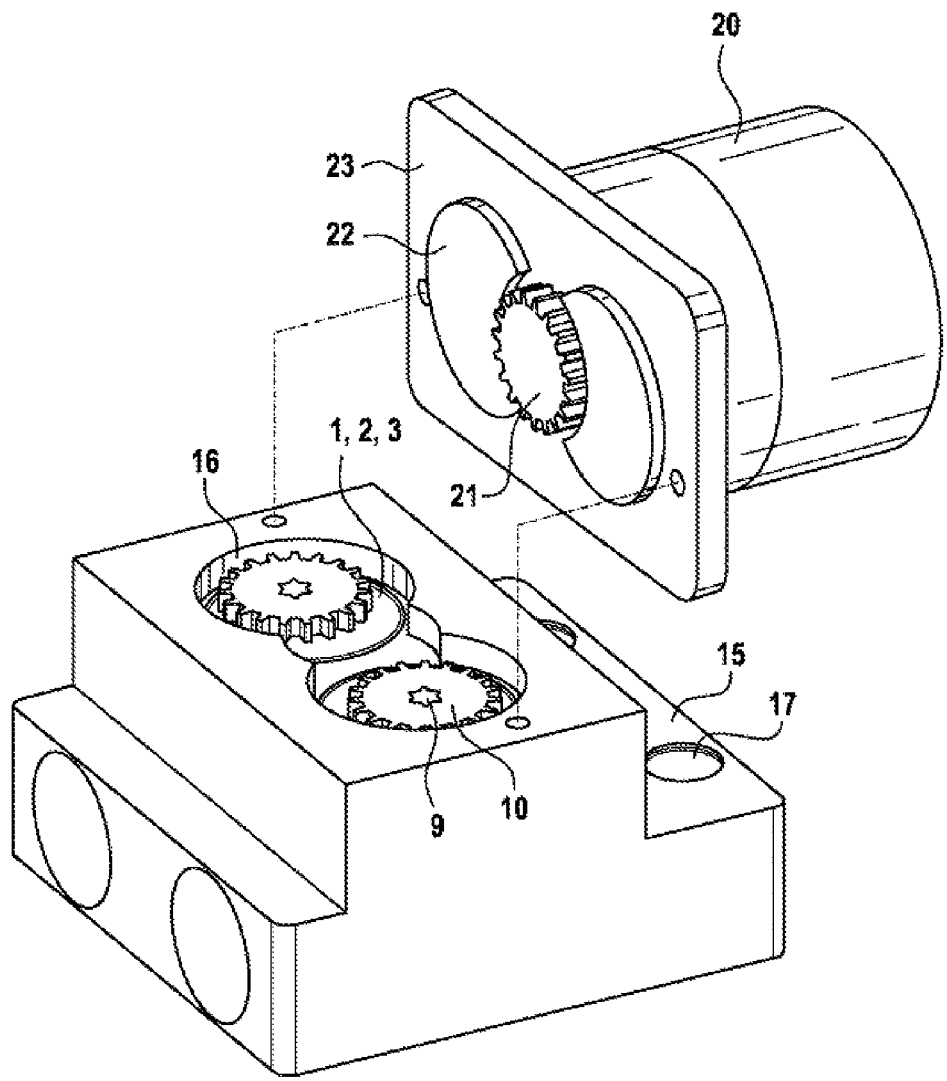
FIG. 4 shows the hydraulic block from FIG. 3 with installed internal gear pumps according to the disclosure.

The hydraulic block 15 has two receptacles 16 for two internal gear pumps 1, which receptacles are designed as cylindrical countersinks which are congruent with the cartridges 3 and into which internal gear pumps 1 can be inserted with an exact fit, as can be seen in FIG. 4. Upon insertion, the open side of the cartridge 3 faces with the exposed axial disk 11 a bottom of the receptacles 16, and the drive wheels 10 are located in open sides of the receptacles 16, so that they are accessible, as can be seen in FIG. 4. The sealing ring 4 in the groove of the cartridge 3 seals off the internal gear pumps 1 in the receptacles 16 in the hydraulic block 15. The exposed axial disk 11 is located at the bottom of the receptacle 16, and the pressure field seal 13 bears sealingly against the bottom of the receptacle 16. A pressure connection bore 18 and a suction connection bore 19 issue in the bottom of the receptacles 16 for the internal gear pumps 1. The pressure connection bore 18 issues into the pressure field 12 of the exposed axial disk 11 in the open side of the cartridge 3 which forms the housing 2 of the internal gear pump 1. The delivery space of the internal gear pumps 1 communicates through the through hole 14 in the axial disk 11 and the pressure field 12 with the respective pressure connection bore 18 which is sealed off, together with the pressure field 12, by means of the pressure field seal 13.

The suction connection bore 19 issues in the region which is cut out of the axial disk 11, so that the suction connection bore 19 communicates with the suction space 8 of the internal gear pump 1. A suction connection and a pressure connection of the internal gear pumps 1 are thus implemented, including the sealing off of the connections, by the internal gear pumps 1 being inserted into the receptacles 16 in the hydraulic block 15. The hydraulic block 15 forms a housing of the two internal gear pumps 1 and is designated here as a surround housing in order to distinguish it from the cartridges 3 which likewise form a housing 2 of the internal gear pumps 1. The two internal gear pumps 1 premounted as subassemblies, together with their cartridges 3 forming their housings 2, are accommodated in the hydraulic block 15 forming the surround housing. The internal gear pumps 1 are fastened in the receptacles 16, for example, by caulking.

The two internal gear pumps 1 are driven jointly by means of an electric motor 20, to which, if appropriate, a gear is flanged. The electric motor 20 can be placed onto the receptacles 16, into which the two internal gear pumps 1 are inserted, and, for example, can be screwed to the hydraulic block 15. The electric motor 20 has a gearwheel, designated here as a driving wheel 21, which is located between the drive wheels 10 of the two internal gear pumps 1 and which meshes with the two drive wheels 10 when the electric motor 20 is fastened to the hydraulic block 15. For securing in position, the electric motor 20 has two projections 22 on both sides of the driving wheel 21, which are congruent with the mouths of the receptacles 16 for the internal gear pumps 1 and which engage with an exact fit into the receptacles 16 over the drive wheels 10. The projections 22 are formed on a flanged plate 23 of the electric motor 20, said flanged plate serving for fastening the electric motor 20 to the hydraulic block 15. Alternatively, securing in position may be afforded by means of a diameter, not illustrated, which is located coaxially around or behind the driving wheel 21 and which engages with an exact fit into the central bore of the hydraulic block 15.

The invention claimed is:

1. An internal gear pump for a hydraulic vehicle brake system, comprising:
   a cartridge which is configured to act as a housing of the internal gear pump, and which is configured to be inserted into a receptacle for the internal gear pump;
   wherein the internal gear pump defines a premountable subassembly that includes;
     a pinion;
     a ring wheel; and
     an axial disk that is configured to laterally seal off a pump space defined by the internal gear pump, and that includes:
       an inside face which bears against end faces of the pinion and of the ring wheel; and
       an outside face opposite said inside face and facing away from the pump space of the internal gear pump, said outside face exposed on the cartridge and defining a pressure field that communicates with a pressure connection bore of the internal gear pump,
   wherein the receptacle for the internal gear pump is located in a surround housing,
   wherein the surround housing has a second receptacle for a second internal gear pump, and
   wherein the internal gear pump has a common drive with the second internal gear pump.

2. The internal gear pump as claimed in claim 1, wherein:
   the cartridge further defines a through hole; and
   the internal gear pump further defines a suction space that is open on one side and that is in communication with the through hole of the cartridge.

* * * * *

UNITED STATES PATENT AND TRADEMARK OFFICE
CERTIFICATE OF CORRECTION

| | | |
|---|---|---|
| PATENT NO. | : 9,616,868 B2 | Page 1 of 1 |
| APPLICATION NO. | : 14/436529 | |
| DATED | : April 11, 2017 | |
| INVENTOR(S) | : Speer et al. | |

It is certified that error appears in the above-identified patent and that said Letters Patent is hereby corrected as shown below:

On the Title Page

Item (54) and in the Specification, Column 1, Line 1, should read:
PRE-ASSEMBLABLE INTERNAL GEAR PUMP Signed and Sealed this
Fourth Day of July, 2017

Joseph Matal
*Performing the Functions and Duties of the*
*Under Secretary of Commerce for Intellectual Property and*
*Director of the United States Patent and Trademark Office*